United States Patent
Hughes et al.

(10) Patent No.: US 11,374,845 B2
(45) Date of Patent: Jun. 28, 2022

(54) DETERMINING A TRANSIT APPLIANCE FOR DATA TRAFFIC TO A SOFTWARE SERVICE

(71) Applicant: HEWLETT PACKARD ENTERPRISE DEVELOPMENT LP, Houston, TX (US)

(72) Inventors: David Anthony Hughes, Los Altos Hills, CA (US); Damon John Ennis, San Jose, CA (US); Theodore Ernest Tedijanto, Cupertino, CA (US); Hon Tat Ho, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/161,596

(22) Filed: Jan. 28, 2021

(65) Prior Publication Data
US 2021/0152456 A1 May 20, 2021

Related U.S. Application Data

(63) Continuation of application No. 17/073,064, filed on Oct. 16, 2020, which is a continuation of application
(Continued)

(51) Int. Cl.
*G06F 15/173* (2006.01)
*H04L 43/16* (2022.01)
(Continued)

(52) U.S. Cl.
CPC .............. *H04L 43/16* (2013.01); *H04L 43/08* (2013.01); *H04L 41/12* (2013.01)

(58) Field of Classification Search
CPC .......... H04L 43/16; H04L 43/08; H04L 41/12
See application file for complete search history.

(56) References Cited

U.S. PATENT DOCUMENTS 1,558,302 A 10/1925 Hill
3,003,541 A 10/1961 Prentice et al.
(Continued)

FOREIGN PATENT DOCUMENTS

| EP | 1507353 A2 | 2/2005 |
|---|---|---|
| JP | 05-061964 A | 3/1993 |
| WO | 01/35226 A1 | 5/2001 |

OTHER PUBLICATIONS

Business Wire, ""Silver PeaK Systems Delivers Family or Appliances for Enterprise-Wide Centralization of Branch Office Infrastructure; Innovative Local Instance Networking Approach Overcomes Traditional Application Acceleration Pitfalls""" (available at http://www.businesswire.com/news/home/20050919005450/en/Silver-Peak-Systems-Delivers-Family-Appliances-Enterprise-Wide#. UVzkPk7u-1.
(Continued)

*Primary Examiner* — Wing F Chan
*Assistant Examiner* — Joseph R Maniwang
(74) *Attorney, Agent, or Firm* — Nolte Intellectual Property Law Group

(57) ABSTRACT

Disclosed is a system and method for optimization of data transfer to a software service. In exemplary embodiments, a computer-implemented method for determining a transit appliance for data traffic to a software service through one or more interconnected networks comprising a plurality of network appliances, comprises determining performance metrics for each of the plurality of network appliances to at least one IP address associated with the software service, and selecting a transit appliance for data transfer to the IP address, the selected transit appliance based at least in part on the performance metrics.

20 Claims, 11 Drawing Sheets

Related U.S. Application Data

No. 15/857,560, filed on Dec. 28, 2017, now Pat. No. 10,812,361, which is a continuation of application No. 14/447,505, filed on Jul. 30, 2014, now Pat. No. 9,948,496.

(51) Int. Cl.
*H04L 43/08* (2022.01)
*H04L 41/12* (2022.01)

(56) References Cited

U.S. PATENT DOCUMENTS

| | | |
|---|---|---|
| 3,054,876 A | 9/1962 | Wood et al. |
| 3,090,027 A | 5/1963 | Phillips et al. |
| 3,130,991 A | 4/1964 | Piragino |
| 3,143,455 A | 8/1964 | Brown |
| 3,152,574 A | 10/1964 | Stout |
| 3,253,277 A | 5/1966 | Preston et al. |
| 3,363,309 A | 1/1968 | Logan et al. |
| 3,397,951 A | 8/1968 | Adrien et al. |
| 3,438,538 A | 4/1969 | Peters |
| 3,516,158 A | 6/1970 | Ferrentino |
| 3,549,048 A | 12/1970 | Goodman |
| 3,584,414 A | 6/1971 | Bahnsen |
| 3,613,071 A | 10/1971 | Quay |
| 3,626,224 A | 12/1971 | Mgneault et al. |
| 3,681,614 A | 8/1972 | Kroos |
| 3,699,490 A | 10/1972 | Macemon |
| 4,494,108 A | 1/1985 | Langdon et al. |
| 4,558,302 A | 12/1985 | Welch |
| 4,612,532 A | 9/1986 | Bacon et al. |
| 5,023,611 A | 6/1991 | Chamzas et al. |
| 5,084,855 A | 1/1992 | Kobayashi et al. |
| 5,159,452 A | 10/1992 | Kinoshita et al. |
| 5,191,710 A | 3/1993 | Fujimaki et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,463,001 A | 10/1995 | Sano et al. |
| 5,483,556 A | 1/1996 | Pillan et al. |
| 5,493,698 A | 2/1996 | Suzuki et al. |
| 5,532,693 A | 7/1996 | Winters et al. |
| 5,570,511 A | 11/1996 | Reich et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,614,368 A | 3/1997 | Ghazarossian et al. |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,728,840 A | 3/1998 | Askin et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Libove et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,823,470 B2 | 11/2004 | Smith et al. |
| 6,839,346 B1 | 1/2005 | Kametani |
| 6,842,424 B1 | 1/2005 | Key et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagarajan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van et al. |
| 7,243,094 B2 | 7/2007 | Tabellion et al. |
| 7,249,309 B2 | 7/2007 | Glaise et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,359,393 B1 | 4/2008 | Nalawade et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,441,039 B2 | 10/2008 | Bhardwaj |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,496,659 B1 | 2/2009 | Coverdill et al. |

(56) References Cited

U.S. PATENT DOCUMENTS

| | | |
|---|---|---|
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |
| 7,624,446 B1 | 11/2009 | Wilhelm |
| 7,630,295 B2 | 12/2009 | Hughes et al. |
| 7,633,942 B2 | 12/2009 | Bearden et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |
| 7,793,193 B2 | 9/2010 | Koch et al. |
| 7,810,155 B1 | 10/2010 | Ravi |
| 7,826,798 B2 | 11/2010 | Stephens et al. |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,924,795 B2 | 4/2011 | Wan et al. |
| 7,925,711 B1 | 4/2011 | Gopalan et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,957,307 B2 | 6/2011 | Qiu et al. |
| 7,970,898 B2 | 6/2011 | Clubb et al. |
| 7,975,018 B2 | 7/2011 | Unrau et al. |
| 7,996,747 B2 | 8/2011 | Dell et al. |
| 8,046,667 B2 | 10/2011 | Boyce |
| 8,069,225 B2 | 11/2011 | McCanne et al. |
| 8,072,985 B2 | 12/2011 | Golan et al. |
| 8,090,027 B2 | 1/2012 | Schneider |
| 8,090,805 B1 | 1/2012 | Chawla et al. |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,271,847 B2 | 9/2012 | Langner |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,553,757 B2 | 10/2013 | Florencio et al. |
| 8,565,118 B2 | 10/2013 | Shukla et al. |
| 8,570,869 B2 | 10/2013 | Ojala et al. |
| 8,576,816 B2 | 11/2013 | Lamy-Bergot et al. |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 | 4/2014 | Zheng et al. |
| 8,700,771 B1 | 4/2014 | Ramankutty et al. |
| 8,706,947 B1 | 4/2014 | Pradeep |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,775,413 B2 | 7/2014 | Brown et al. |
| 8,811,431 B2 | 8/2014 | Hughes |
| 8,843,627 B1 | 9/2014 | Baldi et al. |
| 8,850,324 B2 | 9/2014 | Clemm et al. |
| 8,885,632 B2 | 11/2014 | Hughes et al. |
| 8,891,554 B2 | 11/2014 | Biehler |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,106,530 B1 | 8/2015 | Wang |
| 9,130,991 B2 | 9/2015 | Hughes |
| 9,131,510 B2 | 9/2015 | Wang |
| 9,143,455 B1 | 9/2015 | Hughes |
| 9,152,574 B2 | 10/2015 | Hughes et al. |
| 9,171,251 B2 | 10/2015 | Camp et al. |
| 9,191,342 B2 | 11/2015 | Hughes et al. |
| 9,202,304 B1 | 12/2015 | Baenziger et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,248 B1 | 6/2016 | Hughes |
| 9,363,309 B2 | 6/2016 | Hughes |
| 9,380,094 B2 | 6/2016 | Florencio et al. |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B1 | 4/2017 | Hughes |
| 9,626,224 B2 | 4/2017 | Hughes et al. |
| 9,647,949 B2 | 5/2017 | Varki et al. |
| 9,712,463 B1 | 7/2017 | Hughes et al. |
| 9,716,644 B2 | 7/2017 | Wei et al. |
| 9,717,021 B2 | 7/2017 | Hughes et al. |
| 9,875,344 B1 | 1/2018 | Hughes et al. |
| 9,906,630 B2 | 2/2018 | Hughes |
| 9,948,496 B1 | 4/2018 | Hughes et al. |
| 9,961,010 B2 | 5/2018 | Hughes et al. |
| 9,967,056 B1 | 5/2018 | Hughes |
| 10,091,172 B1 | 10/2018 | Hughes |
| 10,164,861 B2 | 12/2018 | Hughes et al. |
| 10,257,082 B2 | 4/2019 | Hughes |
| 10,313,930 B2 | 6/2019 | Hughes et al. |
| 10,326,551 B2 | 6/2019 | Hughes |
| 10,432,484 B2 | 10/2019 | Hughes et al. |
| 10,637,721 B2 | 4/2020 | Hughes et al. |
| 10,719,588 B2 | 7/2020 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0009079 A1 | 1/2002 | Jungck et al. |
| 2002/0010702 A1 | 1/2002 | Ajtai et al. |
| 2002/0010765 A1 | 1/2002 | Border |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0159454 A1 | 10/2002 | Delmas |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |

(56) References Cited

U.S. PATENT DOCUMENTS

| | | |
|---|---|---|
| 2003/0009558 A1 | 1/2003 | Ben-Yehezkel |
| 2003/0012400 A1 | 1/2003 | McAuliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |
| 2003/0048785 A1 | 3/2003 | Calvignac et al. |
| 2003/0067940 A1 | 4/2003 | Edholm |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1 | 5/2004 | Wang et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | Duree |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0109805 A1 | 5/2006 | Malamal et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | Van et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0076708 A1 | 4/2007 | Kolakowski et al. |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De et al. |
| 2007/0160200 A1 | 7/2007 | Ishikawa et al. |
| 2007/0174428 A1 | 7/2007 | Lev et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0260746 A1 | 11/2007 | Mirtorabi et al. |
| 2007/0263554 A1 | 11/2007 | Finn |
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardeizky et al. |
| 2008/0267217 A1 | 10/2008 | Colville et al. |
| 2008/0285463 A1 | 11/2008 | Oran |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar et al. |
| 2009/0175172 A1 | 7/2009 | Prytz et al. |
| 2009/0182864 A1 | 7/2009 | Khan et al. |

(56) References Cited

U.S. PATENT DOCUMENTS

| | | |
|---|---|---|
| 2009/0204961 A1 | 8/2009 | Dehaan et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0069035 A1* | 3/2010 | Johnson ............ H04L 41/0816 455/404.1 |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | Van et al. |
| 2011/0113472 A1 | 5/2011 | Fung et al. |
| 2011/0131411 A1 | 6/2011 | Lin et al. |
| 2011/0145903 A1* | 6/2011 | Lillie ................ G06F 11/3089 726/7 |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0036325 A1 | 2/2012 | Mashtizadeh et al. |
| 2012/0069131 A1 | 3/2012 | Abelow |
| 2012/0147894 A1 | 6/2012 | Mulligan et al. |
| 2012/0173759 A1 | 7/2012 | Agarwal et al. |
| 2012/0185775 A1 | 7/2012 | Clemm et al. |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez et al. |
| 2013/0086236 A1 | 4/2013 | Baucke et al. |
| 2013/0086594 A1 | 4/2013 | Cottrell |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0266007 A1 | 10/2013 | Kumbhare et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | Van et al. |
| 2014/0075554 A1 | 3/2014 | Cooley |
| 2014/0086069 A1 | 3/2014 | Frey et al. |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0181381 A1 | 6/2014 | Hughes et al. |
| 2014/0269705 A1 | 9/2014 | Decusatis et al. |
| 2014/0279078 A1 | 9/2014 | Nukala et al. |
| 2014/0321290 A1 | 10/2014 | Jin et al. |
| 2014/0379937 A1 | 12/2014 | Hughes et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0110113 A1 | 4/2015 | Levy et al. |
| 2015/0120663 A1 | 4/2015 | Le et al. |
| 2015/0127701 A1 | 5/2015 | Chu et al. |
| 2015/0143505 A1 | 5/2015 | Border et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0334210 A1 | 11/2015 | Hughes |
| 2015/0365293 A1 | 12/2015 | Madrigal et al. |
| 2016/0014051 A1 | 1/2016 | Hughes et al. |
| 2016/0034305 A1 | 2/2016 | Shear et al. |
| 2016/0093193 A1 | 3/2016 | Silvers et al. |
| 2016/0112255 A1 | 4/2016 | Li |
| 2016/0143076 A1* | 5/2016 | Razavi ................ H04W 76/14 370/329 |
| 2016/0218947 A1 | 7/2016 | Hughes et al. |
| 2016/0255000 A1 | 9/2016 | Gattani et al. |
| 2016/0255542 A1 | 9/2016 | Hughes et al. |
| 2016/0359740 A1 | 12/2016 | Parandehgheibi et al. |
| 2016/0380886 A1 | 12/2016 | Blair et al. |
| 2017/0026467 A1 | 1/2017 | Barsness et al. |
| 2017/0070445 A1 | 3/2017 | Zhang et al. |
| 2017/0111692 A1 | 4/2017 | An et al. |
| 2017/0149679 A1 | 5/2017 | Hughes et al. |
| 2017/0187581 A1 | 6/2017 | Hughes et al. |
| 2017/0359238 A1 | 12/2017 | Hughes et al. |
| 2018/0089994 A1 | 3/2018 | Dhondse et al. |
| 2018/0121634 A1 | 5/2018 | Hughes et al. |
| 2018/0131711 A1 | 5/2018 | Chen et al. |
| 2018/0205494 A1 | 7/2018 | Hughes |
| 2018/0227216 A1 | 8/2018 | Hughes |
| 2018/0227223 A1 | 8/2018 | Hughes |
| 2019/0089620 A1 | 3/2019 | Hefel et al. |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1 | 8/2019 | Wu et al. |
| 2019/0253187 A1 | 8/2019 | Hughes |
| 2019/0260683 A1 | 8/2019 | Hughes |
| 2019/0274070 A1 | 9/2019 | Hughes et al. |
| 2019/0280917 A1 | 9/2019 | Hughes et al. |
| 2020/0021506 A1 | 1/2020 | Hughes et al. |
| 2020/0213185 A1 | 7/2020 | Hughes et al. |

OTHER PUBLICATIONS

"Decision Granting Motion to Terminate", Inter Partes Review Case No. IPR2014-00245, Feb. 7, 2018, 4 pages.

"IPsec Anti-Replay Window: Expanding and Disabling," Cisco IOS Security Configuration Guide. 2005-2006 Cisco Systems, Inc. Last updated: Sep. 12, 2006, 14 pages.

"Notice of Entry of Judgement Accompanied by Opinion", United States Court of Appeals for the Federal Circuit, Case: 15-2072, Oct. 24, 2017, 6 pages.

"Shared LAN Cache Datasheet", 1996, <http://www.lancache.com/slcdata.htm>.

(56) References Cited

OTHER PUBLICATIONS

Definition appliance, 2c, Webster's Third New International Dictionary, Unabridged (1993), available at <http://lionreference.chadwyck.com> (Dictionaries/Webster's Dictionary). Copy not provided in IPR2013-00402 proceedings.

Douglis, F. et al., "Application specific Delta-encoding via Resemblance Detection", Published in the 2003 USENIX Annual Technical Conference.

Final Written Decision, dated Dec. 30, 2014, Inter Partes Review Case No. IPR2013-00402.

Final Written Decision, dated Dec. 30, 2014, Inter Partes Review Case No. IPR2013-00403.

Final Written Decision, dated Jun. 9, 2015, Inter Partes Review Case No. IPR2014-00245.

Hong, B et al. "Duplicate data elimination in a SAN file system", In Proceedings of the 21st Symposium on Mass Storage Systems (MSS '04), Goddard, MD, Apr. 2004. IEEE.

Knutsson, Bjorn et al., "Transparent Proxy Signalling", Journal of Communications and Networks, vol. 3, No. 2, Jun. 2001.

Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.

Muthitacharoen, Athicha et al., "A Low-bandwidth Network File System," 2001, in Proc, of the 18th ACM Symposium on Operating Systems Principles, Banff, Canada, pp. 174-187.

Newton, "Newton's Telecom Dictionary", 17th Ed., 2001, pp. 38,201, and 714.

Riverbed, "Riverbed Awarded Patent on Core WDS Technology" (available at http://www.riverbed.com/about/news-articles/pressreleases/riverbed-awarded-patent-on-core-wds-technology.html (last visited Aug. 8, 2014)).

Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).

Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_O.pdf (last visited Aug. 8, 2014)).

Silver Peak Systems, "The Benefits of Byte-level WAN Deduplication" (2008).

Singh et al.; "Future of Internet Security—IPSEC"; 2005; pp. 1-8.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Tseng, Josh, "When accelerating secure Irallic is not secure" (available at http://www.riverbed.com/blogs/whenaccelerati.html?&isSearch=true&pageSize=3&page=2 (last visited Aug. 8, 2014)).

You, L. L. and Karamanolis, C. 2004. "Evaluation of efficient archival storage techniques", In Proceedings of the 21st IEEE Symposium on Mass Storage Systems and Technologies (MSST).

You, L. L. et al., "Deep Store An Archival Storage System Architecture" Data Engineering, 2005. ICDE 2005. Proceedings of the 21st Inti. Conf. on Data Eng.,Tokyo, Japan, Apr. 5-8, 2005, pp. 12.

\* cited by examiner

| Service | IP address/subnet | Test method | Other data |
|---|---|---|---|
| Software Service 110A | 152.3.4.0/24 | ping 152.3.4.5 | ... |
| | 97.5.6.0/24 | http-ping 97.5.6.50 | ... |
| | | tcp-ping 97.5.6.51 | ... |
| Software Service 110B | 178.3.4.0/20 | http-ping 178.3.4.5 | ... |
| | 179.3.4.0/20 | ping 179.3.4.5 | ... |
| ... | ... | ... | ... |
| Software Service 110N | ... | ... | ... |

300

| Software Service | IP address/subnet | Test method | Measured metric(s) | Derived metric |
|---|---|---|---|---|
| Software Service 110A | 152.3.4.0/24 | ping 152.3.4.5 | 70 ms | 7 |
| | 97.5.6.0/24 | http-ping 97.5.6.50 | 80 ms | 7.5 |
| Software Service 110B | {178.../20, test IP} | tcp-ping 973.5.6.51 | 70 ms | ⋮ |
| | {179.../20, test IP2} | ⋮ | ⋮ | ⋮ |
| ⋮ | ⋮ | ⋮ | ⋮ | ⋮ |
| | ⋮ | ⋮ | ⋮ | ⋮ |
| Software Service 110N | ⋮ | ⋮ | ⋮ | ⋮ |

| Subnet | Peer Appliance | Advertised Metric |
|---|---|---|
| a.b.c.d/24 | 104 | 5 |
| | 106 | 20 |
| | 116 | 10 |
| | 112 | 7.5 |
| e.f.g.h/20 | 104 | 15 |
| | 106 | 20 |
| | 116 | 10 |
| | 112 | 8 |
| ... | ... | ... |

FIG. 4

| Service | IP Address/subnet | Selected transit appliance | Optimization |
|---|---|---|---|
| Service 110A | {152...../24, test IP} | Appliance 104A | ☐ |
| Service 110B | ⋮ | Appliance 104B | ☑ |
| Service 110C | ⋮ | Appliance 104C | ☐ |
| Service 110N | ⋮ | Appliance 104A | ☑ |

DETERMINING A TRANSIT APPLIANCE FOR DATA TRAFFIC TO A SOFTWARE SERVICE

CROSS-REFERENCE TO RELATED APPLICATIONS

This application is a continuation of and claims the priority benefit of U.S. patent application Ser. No. 17/073,064 filed on Oct. 16, 2020, which is a continuation of and claims the priority benefit of U.S. patent application Ser. No. 15/857,560 filed Dec. 28, 2017, U.S. Pat. No. 10,812,361 granted on Oct. 20, 2020, which is a continuation of and claims the priority benefit of U.S. patent application Ser. No. 14/447,505 filed on Jul. 30, 2014, U.S. Pat. No. 9,948,496 granted on Apr. 17, 2018. The disclosure of the above-referenced applications are incorporated herein in their entirety for all purposes.

TECHNICAL FIELD

This disclosure relates generally to optimization of data transfer to a software service via a transit appliance.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Data centers may be used to provide computing infrastructure by employing a number of computing resources and associated components, such as telecommunication equipment, networking equipment, storage systems, backup power supplies, environmental controls, and so forth. A data center may provide a variety of services (e.g., web applications, email services, and search engine services) for a number of customers simultaneously. To provide these services, the computing infrastructure of the data center may run various software applications and store business and operational data. The computing resources distributed throughout the data center may be physical machines and/or virtual machines running on a physical host.

Computing resources of a data center may transmit and receive data packets via one or more interconnected networks, such as a Wide Area Network (WAN). Physical switches and routers can be distributed throughout the WAN and configured to connect various network segments and route the data packets within the network environment. It may be desirable to optimize or otherwise transform the data packets transmitted and received via the WAN. Routing of the data packets for optimization may be performed by configuring physical switches, routers, and/or other network appliances, to reroute the data packets to a data optimization virtual machine. However, involving reconfiguration of physical network components in data optimization may be costly and require complex coordination of various organizations and departments.

Additionally, an increasing number of computing resources and services are being hosted in the cloud. Infrastructure as a Service (IaaS) allows an organization to outsource the equipment used to support operations. As such, a request for a service may be first routed to a server associated with the service, with the server being housed in an IaaS center.

Software as a Service (SaaS) is also increasingly prevalent as it allows a user to access software services from any computing terminal. Access times for a user to access the SaaS may vary depending on the location from which a user is trying to access the software service. As the access time increases, the user may perceive performance and usability problems with the service. Furthermore, the software service hosted as SaaS may have its necessary computing equipment located in one or more physical locations, including IaaS locations. As such, a user request for a software service may first travel through one or more interconnected networks to one or more IaaS centers and then to the SaaS, which can be located anywhere in the world. Because the data may have to travel substantial geographic distances from each intermediate point, this increases the response time to the end user as well as the opportunities for packet loss.

While there are many optimization techniques that can be accomplished in a WAN, many of these optimization techniques for data transfer across a network require symmetric network components. For example, if data packets are encoded on the transmitting end before transmission through the network, they must be decoded on the receiving end. To optimize data transfer to a particular software service, it is desirable to decode the data as close to the requested software service as possible.

Therefore, a mechanism is needed to find an optimal transit appliance for a requested software service based on network performance characteristics, so that a user can access a software service with the most efficiency.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In exemplary embodiments, a computer-implemented method for selecting a transit appliance for data traffic to a software service through a network comprising a plurality of network appliances, comprises: measuring one or more performance metrics of data traffic from at least one of the plurality of network appliances to an IP address associated with a software service, the IP address for the software service having been retrieved from a service directory; determining a derived performance metric to be advertised to the plurality of network appliances, the derived performance metric based at least in part on the one or more measured performance metrics; advertising the derived performance metric among one or more of the plurality of network appliances; updating an advertised metric table at one or more of the plurality of network appliances with the derived performance metric received from at least one of the plurality of network appliances; and selecting a transit appliance for data traffic to the IP address associated with the software service, the selection based at least in part on the advertised performance metrics. The performance metric may be based on at least one of network latency, data loss, and round trip time. The software service to be accessed may be hosted in a cloud-based environment. One or more of the plurality of network appliances may also be hosted in a cloud-based environment.

In further exemplary embodiments, the above method steps may be stored on a machine-readable medium comprising instructions, which when implemented by one or more processors perform the steps of the method. In yet further examples, subsystems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which:

FIG. 3 illustrates an exemplary measured metric table at an appliance.

FIG. 4 illustrates an exemplary advertised metric table at an appliance.

FIG. 8 is a screenshot of an exemplary GUI for a user to select optimization of data traffic to and from particular software services.

DETAILED DESCRIPTION

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that"A or B" includes "A but not B," "B but not A," and "A and B," unless otherwise indicated.

The embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to computer-implemented methods for optimization of data transfer to a software service via a transit appliance.

Figure 1A:
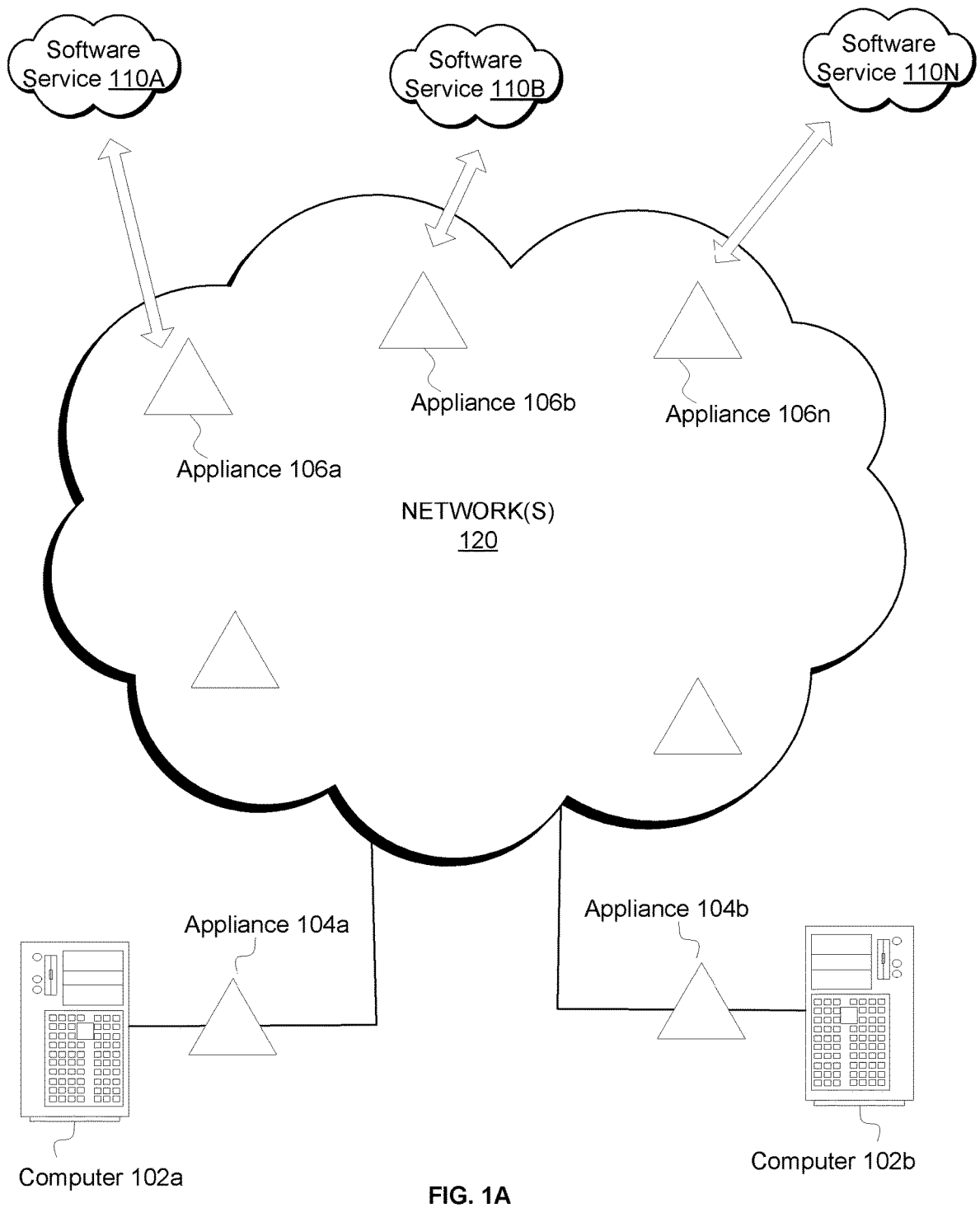
FIG. 1A depicts an exemplary system environment for determining a transit appliance for transfer of data traffic to and from a software service.

FIG. 1A depicts an exemplary system environment for determining a transit appliance for transfer of data traffic to and from a software service across one or more interconnected networks 120, such as the Internet, or any other wide area network. In the exemplary embodiment, a user at computer 102a may access a software service, such as software service 110A, software service 110B, or software service 110N. While three software services are depicted here, there can be any number of software services. Data packets from the user at computer 102a may be transmitted via appliance 104a, which may also be referred to herein as the first appliance or ingress appliance for the request. Data packets from the user at computer 102b may be transmitted via appliance 104b, which is the first appliance or ingress appliance for that request.

The data packets from the user are then transmitted across the one or more interconnected networks 120, where there may be one or more peer appliances at different locations. In various embodiments as discussed herein, each of these peer appliances are in communication with each other, and form an overlay network that optimizes communication between the appliances. For example, the appliances may transfer data packets within the overlay network using one or more data transfer optimization techniques, such as compression/decompression, deduplication, TCP acceleration, performance enhancing proxy, packet reconstruction, error correction, or any other technique for optimizing data transfer between network appliances or devices.

Embodiments of the present disclosure provide for the selection of a transit appliance (also referred to herein as a second appliance or egress appliance), for each software service. The selected transit appliance (also referred to herein as the optimal transit appliance) may be the appliance which has the best network performance metrics for providing access to the requested software service, or component of the requested software service. In the exemplary embodiment depicted in FIG. 1A, the optimal transit appliance for software service 110A is appliance 106a, the optimal transit appliance for software service 110B is appliance 106b, and the optimal transit appliance for software service 110N is appliance 106n. As discussed further herein, appliances 106a, 106b, and 106n can be geographically located anywhere in the world.

Figure 1B:
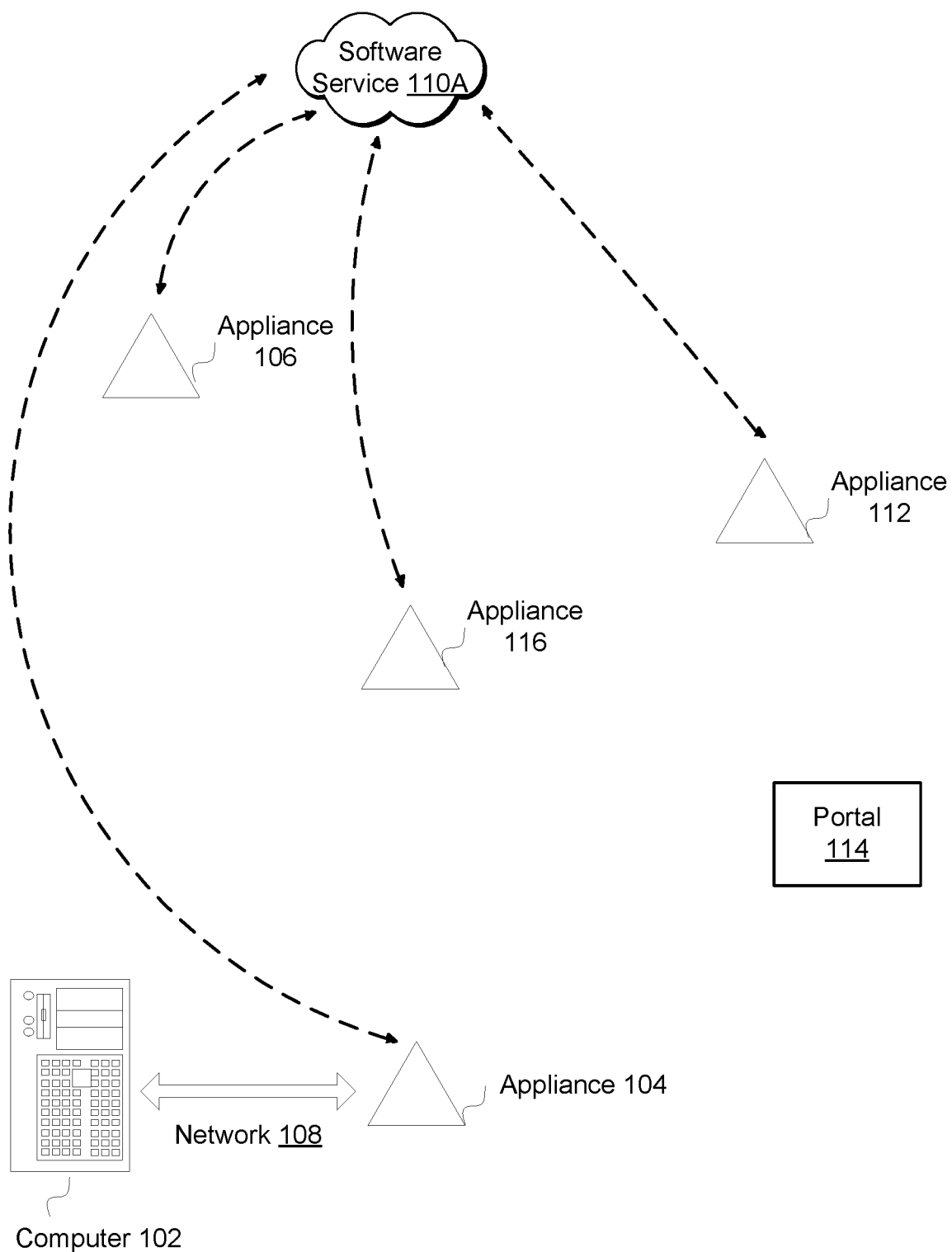
FIG. 1B depicts an exemplary system environment for determining a transit appliance for transfer of data traffic to and from a software service.

FIG. 1B depicts an exemplary system environment for determining a transit appliance for transfer of data to and from a software service across the one or more interconnected networks. In the exemplary embodiment, an end user accesses a software service, such as software service 110A, through computer 102. Computer 102 may be a desktop computer, laptop computer, handheld computing device, server, or any other type of computing device. While a single computer is depicted here, computer 102 may also be a cluster of computing devices.

The request for software service 110A from computer 102 is transmitted via appliance 104, which is in communication with computer 102 through a network 108. The network 108 may include one or more of the following: WAN, the Internet, Metropolitan Area Network (MAN), Backbone network, Storage Area Network (SAN), Advanced Intelligent Network (AIN), Local Area Network (LAN), Personal Area Network (PAN), and so forth.

Appliance 104 can be any type of hardware device, or software operational on a computing device. Appliance 104 may be located at the same geographical location as computer 102, or may be located in a remote location. Appliance 104 may be in communication with other appliances across the network, such as appliances 106, 116, and 112, regardless of geographical location of the appliances. While appliance 104 is in communication with three other appliances in the exemplary embodiment depicted in the figure, there may be any number of appliances in the system. The appliances together may form an overlay network over the one or more interconnected networks between computer 102 and software service 110A.

Each of the appliances in the system may further be in communication with a portal 114. Portal 114 comprises a database with a service directory for the various software services, the IP addresses/subnets associated with each software service, and one or more test methods for determining network performance characteristics for each appliance in relation to the IP addresses/subnets associated with each software service. Portal 114 is also discussed in further detail below with respect to later figures. Each appliance in the overlay network is in communication with the portal 114 and retrieves a copy of the service directory. In various embodiments, the service directory is stored locally at each appliance, and the local copy at each appliance is updated on a fixed periodic schedule, upon a change in the service directory, upon the direction of a network administrator, or other triggering event. Exemplary changes in the service directory include the addition of a new software service, deletion of a software service, a change in an associated IP address/subnet, or a change in a test method.

Software service 110A may have an exemplary IP subnet of a.b.c.d/24. An appliance may query an IP address from the IP subnet using the information from the portal service directory to determine network performance characteristic(s) for the transmission of data between that appliance and software service 110A. The performance metric comprises information such as latency, round trip time, data loss, or any other network performance characteristic. The appliance then stores the measured performance metric(s) for the IP address or subnet in a local network performance characteristics table or database, referred to herein as a measured metric table. The measured metric table is discussed in further detail below in connection with FIG. 3.

Figure 2:
FIG. 2 illustrates an exemplary service directory from the portal.

FIG. 2 shows an exemplary service directory 200 from the portal 114. In various embodiments, the service directory 200 provides a listing of the various software services that are available for optimized access through the overlay network of appliances. There can be any number of software services in the service directory, such as software service 110A, 110B, and 110N. Each software service can have one or more IP addresses or IP subnet associated with it. The IP addresses may be in IPv4, IPv6, or other network addressing systems. While the term "IP address" has been used throughout this disclosure, a person of ordinary skill in the art would understand that any other network addressing system besides IP is also within the scope of this disclosure.

The service directory 200 can provide a listing of each IP address or subnets associated with the software service, one or more test IP addresses, and one or more test methods for the IP addresses. In various embodiments, additional data associated with each software service is also stored in the service directory 200, as understood by a person of ordinary skill in the art. The service directory 200 can be updated on a fixed periodic schedule, upon certain trigger events, or as directed by a network administrator.

In the exemplary service directory 200 of FIG. 2, software service 110A has two exemplary IP subnets, 152.3.4.0/24 and 97.5.6.0/24. The subnets may be in different geographical locations. Each IP subnet has one or more test methods associated with it. The test method can be ping IP, http-ping IP, tcp-ping IP, or any other test method as understood by a person of ordinary skill in the art. Each test method denotes the mechanism whereby the appliance queries an IP address associated with the software service to determine network performance characteristic(s) for the transmission of data from that appliance to the software service. As understood by a person of ordinary skill in the art, the subnet may contain many IP addresses. The test method may sample one or more of the included IP addresses, as testing every IP address in the subnet may introduce more traffic and overhead for very little additional information. Also, one service may have different optimal transit nodes for different parts of the service.

FIG. 3 shows an exemplary measured metric table 300 stored at each appliance for collecting measured metrics from that appliance to each software service. For each software service, the IP address or subnet associated with that software service is noted, along with the test method(s) used. The listing of software services, IP address/subnet, and test method(s) may be retrieved by each appliance from the service directory 200 in portal 114. In various embodiments, the measured metric table 300 is updated on a periodic fixed schedule, upon direction by a network administrator, or upon another triggering event, such as a change or addition of a subnet. Upon receipt of new information or a new service directory 200 from the portal 114, the information may be merged into the measured metric table 300 such that previous information from the measured metric table is maintained, if still applicable. Additionally, while the measured metric table and all other tables are described herein as "tables", the data can also be represented using other data structures, as understood by a person of ordinary skill in the art.

In exemplary embodiments, an appliance queries one or more IP addresses associated with each software service in the table using the one or more test methods and measures one or more network performance characteristics. These characteristics may be stored in the measured metric table 300 as the measured metric(s). A derived metric related to the measured metric(s) is also stored in the measured metric table 300. The derived metric is a calculated or selected metric value that may be advertised, along with the corresponding tested IP address or subnet, with other peer appliances in the overlay network.

In the exemplary embodiment of FIG. 3, software service 110A has two associated IP subnets. For the IP subnet 152.3.4.0/24, the appliance queries the IP address 152.3.4.5 using a ping test method and measures a network performance metric of 70 milliseconds. For the IP subnet 97.5.6.0/24, the appliance queries the IP address 97.5.6.50 using an http-ping test method and measures a metric of 80 milliseconds, and also queries the IP address 97.5.6.51 using a tcp-ping test method and measures a metric of 70 milliseconds. In various embodiments, each measured metric may be stored in the measured metric table 300 for a fixed period of time, upon expiry of which it may need to be measured again. Additionally, the measured metric table 300 may keep a rolling average or other statistical aggregation for each measured metric instead of only the latest measured value(s). The statistical aggregation may be reflected in the measured metric(s), derived metric, or an additional field in the measured metric table 300.

From the various measured metrics, a derived metric may be calculated or selected for each tested IP address or subnet. The derived metric may be an average, mean, median, or any other statistical or calculated value from the one or more measured metrics. In the exemplary embodiment of FIG. 3, the derived metric for the IP subnet 97.5.6.0/24 is based on a scaled average of the two measured metrics from the http-ping and tcp-ping test methods. The derived metric may be updated on a periodic fixed schedule, as directed by a network administrator, or upon a triggering event, such as a change in a measured metric value.

In exemplary embodiments, the derived metric is then advertised by an appliance with the other appliances in the overlay network. For example, in the exemplary system environment of FIG. 1B, appliance 104 advertises one or more of its derived metric(s) for the IP address/subnet associated with software service 110A, with the peer appliances 106, 116, and 112. Similarly, one or more of the other appliances 106, 116, and 112 may also advertise one or more of their derived metric(s) for the IP address/subnet associated with software service 110A with all other peer appliances in the network. In various embodiments, an appliance may advertise all of the derived metrics for a particular software service, or only advertise a derived metric that is closest to a specified value, or a derived metric representative of the most ideal network characteristics, such as the lowest value or highest value. The derived metrics may be advertised to the other peer appliances on a periodic schedule, as directed by a network administrator, or upon a triggering event, such as a change in a derived metric value. Furthermore, if the derived metric is below or above a certain threshold, it may not be advertised with the other peer appliances.

FIG. 4 shows an exemplary advertised metric table 400 for collecting advertised metrics from the appliances in the overlay network. While FIGS. 2-4 have been described herein as a "table," the data can be represented by other data structures as well, as understood by a person of ordinary skill in the art.

The advertised metric table 400 shows that for exemplary subnet a.b.c.d/24, peer appliance 104 has advertised a performance metric of 5, peer appliance 106 has an advertised performance metric of 20, peer appliance 116 has an advertised performance metric of 10, and peer appliance 112 has an advertised performance metric of 7.5. In various embodiments, a transit appliance for each IP subnet is selected based on the peer appliance with the lowest value advertised metric, the highest value advertised metric, or the advertised metric that is closest to a specified value. The specified value can be any value determined by a network administrator. In the exemplary embodiment of FIG. 4, the selected performance metric for subnet a.b.c.d/24 is the lowest value of 5, which corresponds to appliance 104. As such, appliance 104 is the optimal transit appliance to route data traffic through for the subnet a.b.c.d/24. In the exemplary embodiment of FIG. 4, the selected metric is noted by a box around the number. In other embodiments, the selected metric can be noted by any other means. Additionally, the advertised metric table 400 may optionally comprise one or more additional columns to note the peer appliance with the selected metric for the IP subnet as the optimal transit appliance, or to store any other information.

For exemplary subnet e.f.g.h/20, peer appliance 104 has an advertised metric of 15, peer appliance 106 has an advertised metric of 20, peer appliance 116 has an advertised metric of 10, and peer appliance 112 has an advertised metric of 8. If the selected performance metric is taken as represented by the lowest value, then peer appliance 112 is the selected transit appliance for the subnet e.f.g.h/20.

Advertised metric table 400 may be stored locally at each appliance, or stored in another central location that is accessible by all of the peer appliances, or stored and shared between appliances in other ways. In various embodiments, the table is updated on a periodic schedule, upon direction by a network administrator, or upon another triggering event, such as a change or addition of a subnet, peer appliance, or updated advertised metric. In various embodiments, each peer appliance's advertised metric may be stored in the advertised metric table 400 for a fixed period of time, upon expiry of which it may need to be updated. Additionally, the advertised metric table 400 may keep a rolling average or other statistical aggregation for each advertised metric instead of only the latest advertised values.

Figure 5:
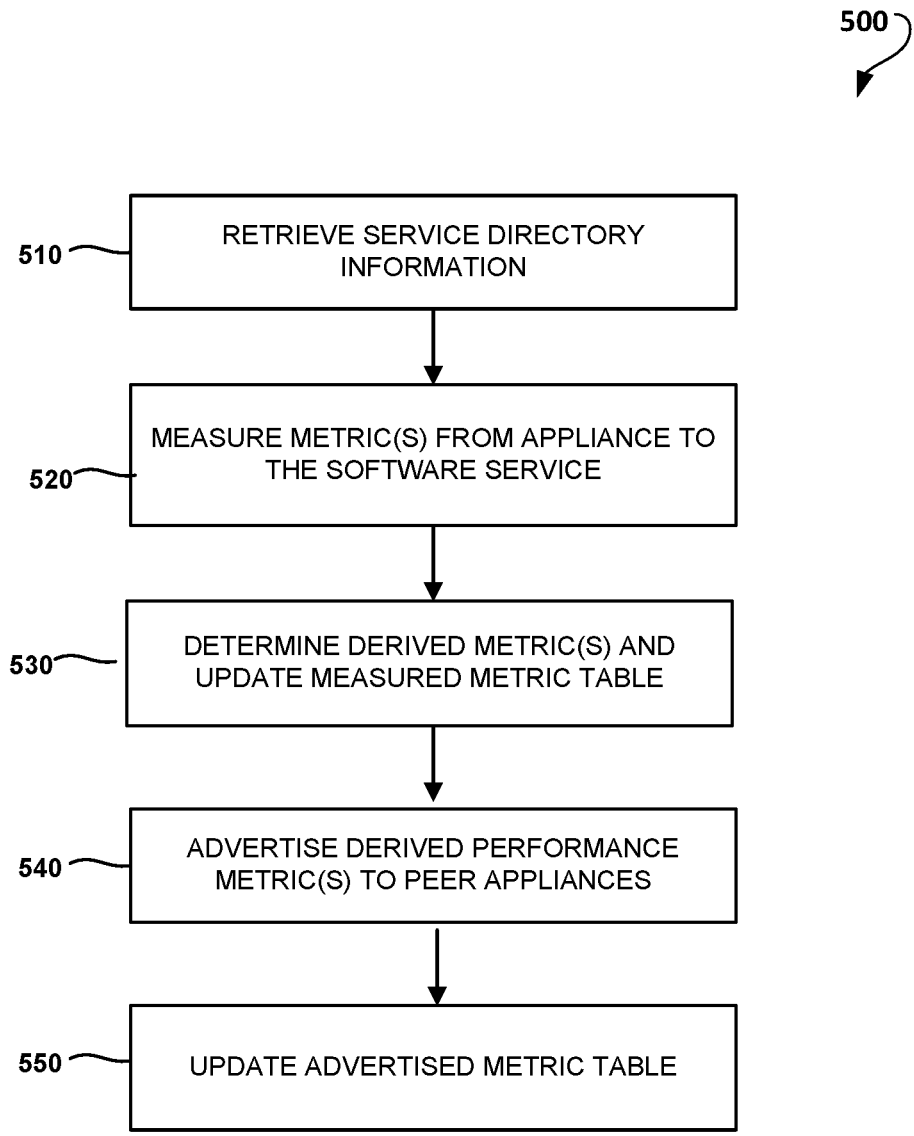
FIG. 5 is a process flow diagram illustrating an exemplary method for the determination of a transit appliance to a software service.

Now referring to FIG. 5, a flowchart 500 showing an exemplary method for the determination of a transit appliance to a software service is presented. The method may be performed by one or more peer appliances in the network. Additionally, steps of the method may be performed in varying orders or concurrently. Furthermore, various steps may be added, removed, or combined in the method and still fall within the scope of the present invention.

In step 510, an appliance retrieves information from the service directory 200. In step 520, the appliance measures performance metric(s) to one or more specified software services using the information from the service directory, such as the IP address or subnet for each software service and test method(s). From the measured metric(s), derived metric(s) are determined for each tested IP address, and the information is stored in the measured metric table 300 at the appliance in step 530. The appliance advertises a selected derived performance metric to the other peer appliances in step 540. As previously disclosed, the appliance may not advertise a derived performance metric if the derived performance metric is outside of a specified threshold. In step 550, the advertised metric table 400 at each peer appliance in the network is updated with the advertised performance metric if an updated advertised performance metric value was advertised. The optimal transit appliance for each software service is determined from the advertised metric table, as discussed above. The advertised metric may also have a time period for which it is valid, upon expiry of which it is calculated, selected, or advertised again.

Each step of the method may be performed at different times (asynchronously), even though it is depicted as a sequence in FIG. 5. For example, if the measured metric doesn't change for a particular appliance, then it may not be advertised in step 540. Additionally, each appliance in the network can perform each step of this method at varying times. Steps of the method may be performed on a periodic fixed schedule, at the direction of a network administration, or upon any other triggering event.

Figure 6:
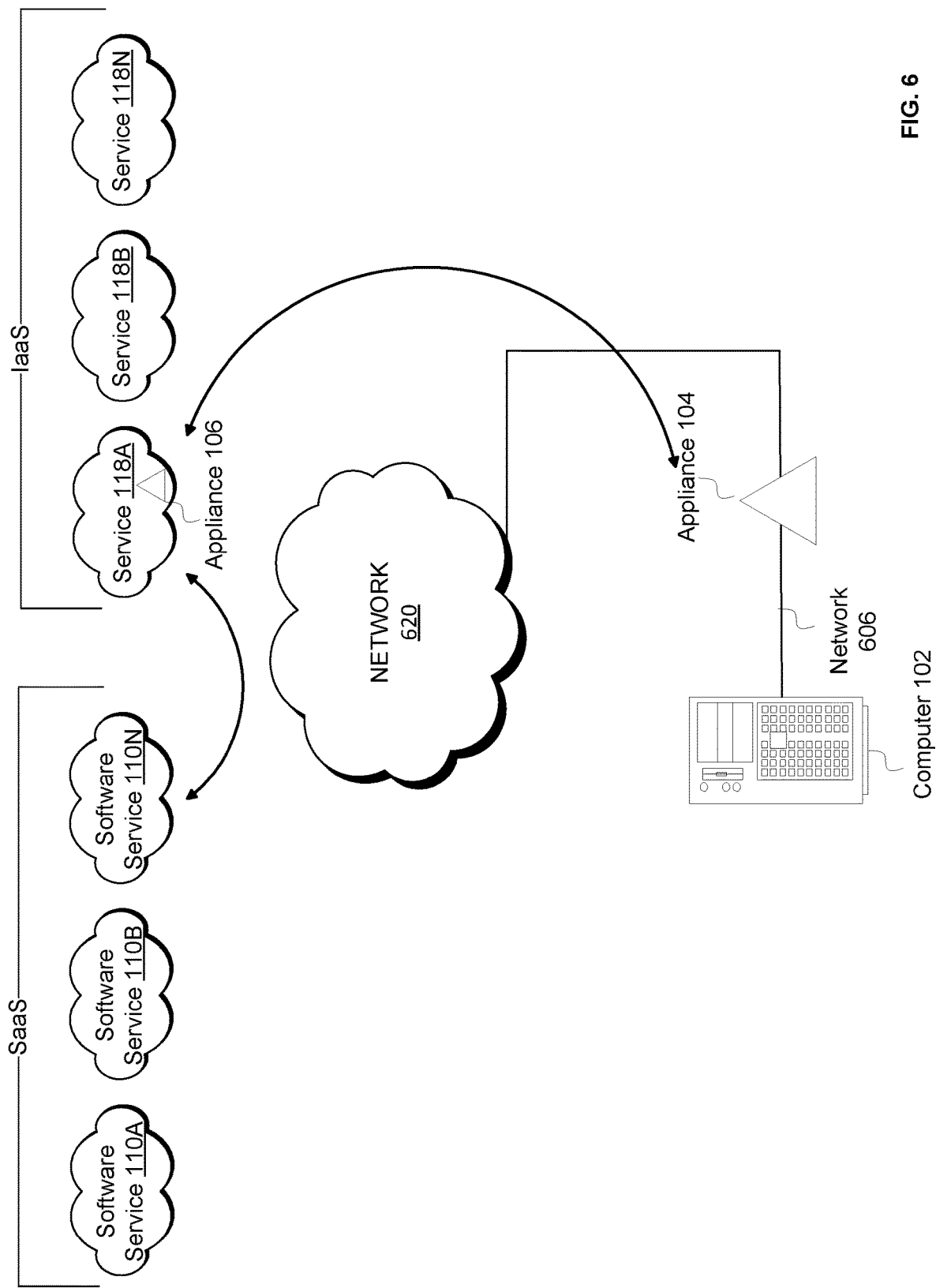
FIG. 6 shows an exemplary system environment suitable for implementing methods for optimization of data across one or more interconnected networks.

FIG. 6 shows an exemplary system environment suitable for implementing methods for optimization of data across one or more interconnected networks. Three software services are depicted in the exemplary embodiment of FIG. 6, software service 110A, 110B, and 110N. However, there can be any number of software services in communication with the various appliances of the overlay network. While two appliances are depicted in the exemplary system of FIG. 6, there can be any number of appliances in communication over one or more interconnected networks.

In the exemplary system of FIG. 6, an end user accesses a software service, such as software service 110N, through computer 102 by sending data packets to software service 110N via appliance 104 through network 606. As discussed above with respect to FIGS. 1A and 1B, computer 102 may be a desktop computer, laptop computer, handheld computing device, server, or any other type of computing device. While a single computer is depicted here, computer 102 may also be a cluster of computing devices. Also, network 606 may be any type of network, as discussed above with respect to network 108 of FIG. 1B.

Appliance 104 may extract the IP address for software service 110N from the destination IP address in the data packets it receives from the computer 102. Appliance 104 may then query its advertised metric table 400 for the peer appliance in the overlay network via which to direct the request for the software service based on the extracted IP address. The selected peer appliance may constitute the optimal transit appliance for the extracted IP address. If the advertised metric table 400 contains a transit appliance for the extracted IP address of the software service, appliance 104 directs the request via the transit appliance noted for the IP address. A row of the advertised metric table 400 is said to contain an IP address, if that IP address belongs inside the subnet that the row corresponds to. Furthermore, a user request for a software service may be directed through any number of network appliances, routers, switches, or other network devices before the request is routed to the software service, depending on the network path.

In the exemplary embodiment depicted in FIG. 6, appliance 104 determines that the optimal transit appliance for the extracted IP address associated with desired software service 110N is through appliance 106 located at service 118A. Service 118A may contain computing devices that enable software service 110N, or may be unrelated to software service 110N. By placing appliance 106 at IaaS service 118A, appliance 106 may be located close to software service 110N. As such, appliance 106 may have good network performance characteristics for data transfer to and from software service 110N and is likely to be a good transit appliance for software service 110N.

While services 118A, 118B, and 118N are depicted in FIG. 6 as exemplary cloud services within an IaaS location, they may be located outside of the cloud. Furthermore, appliance 106 may be located anywhere in the world, and may not necessarily be in an IaaS center. FIG. 6 depicts an exemplary embodiment where appliance 106 is the selected transit appliance for software service 110N and is located at an IaaS service.

In various embodiments, appliance 106 also performs network address translation (NAT) on the data before forwarding the software service request to software service 110N, such that the request for software service 110N appears to originate from appliance 106. This way, the reply from software service 110N is also routed back through the transit appliance 106.

In some cases, appliance 104 may determine that there is no optimal transit appliance for software service 110N, or the transit appliance is appliance 104. If there is no optimal transit appliance for software service 110N, the user request for software service 110N may be directed from appliance 104 to software service 110N over the network 620, without using the overlay of optimizing peer appliances. Network 620 can be any type of network, including a Wide Area Network (WAN), the Internet, and so forth. In various embodiments, default routing behavior is also stored in one or more routing tables. The routing tables can be stored in each appliance of the network, and/or in a central location accessible to all appliances.

Software service 110N may process the data packets received from appliance 106 and direct the reply to the appliance from which the request was forwarded, in this case appliance 106 located in Service 118A. Appliance 106 then performs network address translation on the data, to direct it to the appliance originating the request, appliance 104. From appliance 104 the reply is sent back to computer 102. In various embodiments, there may be any number of intermediate appliances between appliance 104 and software service 110N. Each intermediate appliance may perform network address translation to ensure that the reply is routed back through the network via the same path.

Figure 7A:
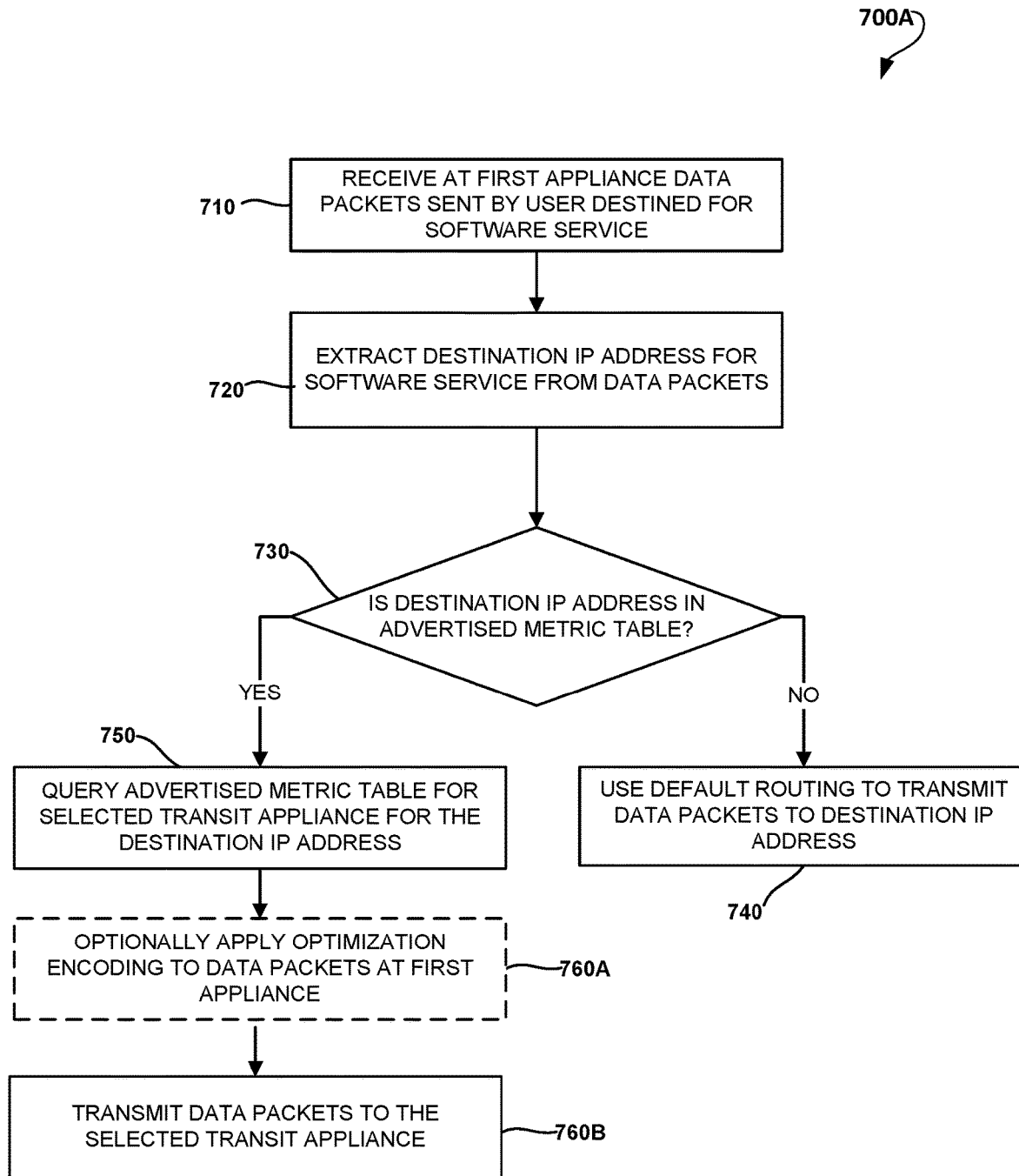
FIG. 7A is a process flow diagram illustrating an exemplary method for the transmission of data packets for a software service via a first appliance.

FIG. 7A is an exemplary flow diagram 700A for the transmission of data packets for a software service through one or more interconnected networks via a first appliance. The method may be performed by one or more peer appliances in the network. Additionally, steps of the method may be performed in varying orders or concurrently. Furthermore, various steps may be added, removed, or combined in the method and still fall within the scope of the present invention.

At step 710, a first appliance (such as appliance 104) receives data packets sent by a user destined for a software service from computer 102. In step 720, the first appliance extracts the destination IP address for the software service from the received data packets. At step 730, the first appliance determines if the extracted destination IP address is in one of the subnets in the advertised metric table 400. If not, the first appliance transmits the data packets destined for the software service to the destination IP address for the software service via default routing behavior in step 740. If the destination IP address is in the advertised metric table 400, the first appliance queries the advertised metric table 400 for the selected transit appliance for the destination IP address, in step 750. While IP addresses are used in this example, the invention can also be applied to other network addressing types.

At step 760A, the first appliance may optionally optimize the data packets destined for the software service. Data optimization techniques may comprise compression/decompression, deduplication, TCP acceleration, performance enhancing proxy, packet reconstruction, error correction, or any other technique for optimizing data transfer between network appliances or devices. For simplification purposes, the term 'optimization encoding' is used in the figures. However, a person of ordinary skill in the art would understand that any optimization technique may be applied. Optimization encoding and decoding are symmetric transformations of data, such as compression/decompression, deduplication, etc. For example, data packets that are compressed at a first appliance need to be decompressed at a second appliance. At step 760B, the first appliance transmits the data packets for the software service to the optimal transit appliance with the selected performance metric. Optimization may be performed on a packet by packet basis, such that there is an encoded packet for each original packet, or optimization may be performed on parts of packets or across multiple packets, such that there is not a 1:1 correspondence between the original packets and the encoded packets.

Figure 7B:
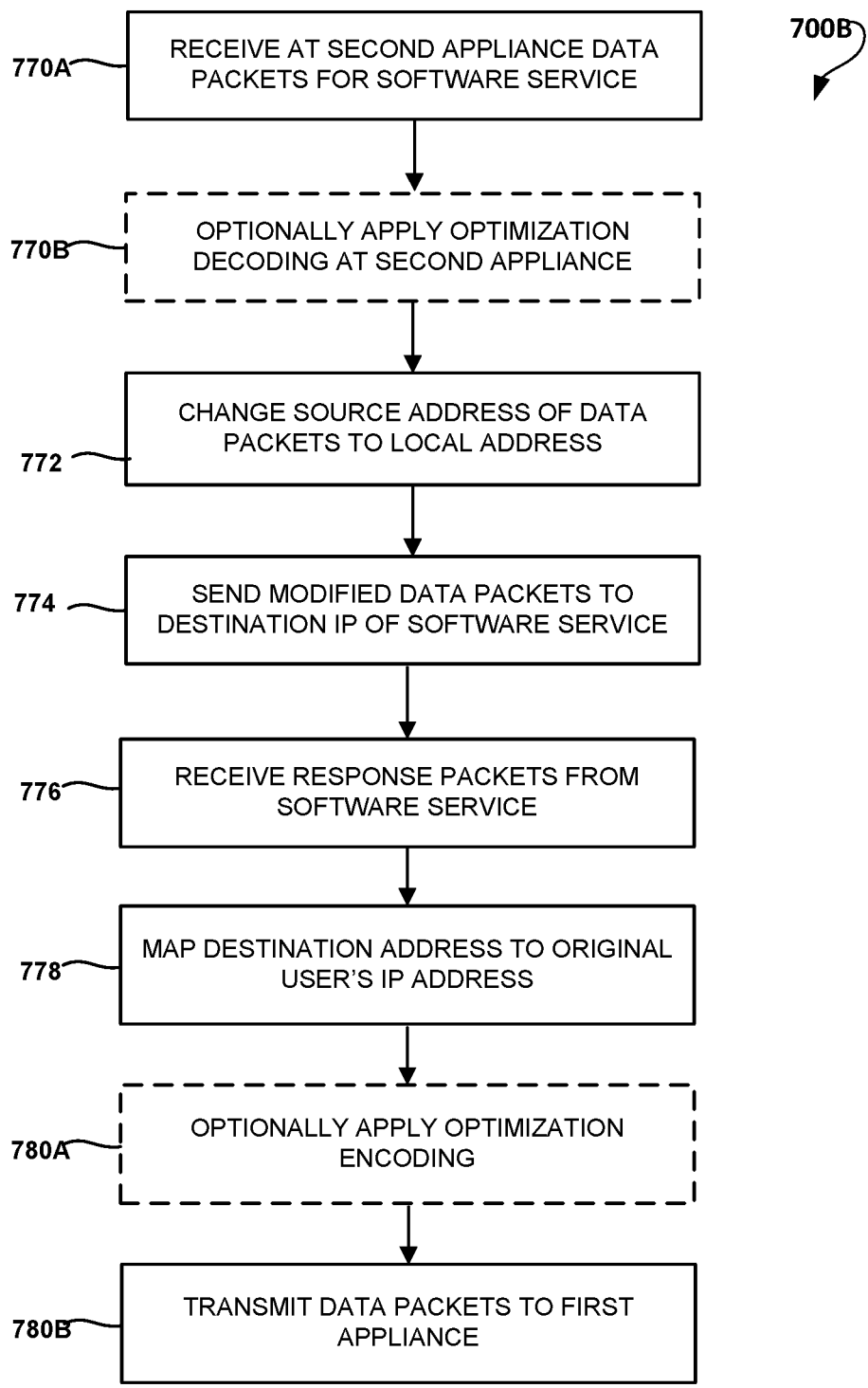
FIG. 7B is a process flow diagram illustrating an exemplary method for the transmission of data packets for a software service via a transit appliance.

FIG. 7B is an exemplary flow diagram 700B for the transfer of data packets for a software service through a transit appliance, also referred to as a second appliance. At step 770A, a second appliance (such as transit appliance 106 from FIG. 6) receives plain or encoded data packets representing data sent by a user destined for a software service from computer 102. At step 770B, the second appliance optionally applies optimization decoding of the data packets. If data packets from the first appliance were optimized in step 760A in any way, such as encoded, then the packets may be decoded at step 770B.

In step 772, the second appliance performs network address translation to change the source network address in the data packets to its own local network address. At step 774, the second appliance sends the modified data packets to the destination IP address of the requested software service. Response packets are received from the software service at step 776. The second appliance then maps the destination address from the response packets to the original user's IP address (such as the IP address of computer 102), at step 778. The data packets from the software service are then optionally encoded at step 780A by the second appliance. This may be a similar step to the optimization technique applied at the first appliance in step 760A, or a different optimization technique may be applied to the reply data packets. The data packets are transmitted back to the first appliance (or ingress appliance) at step 780B. The first appliance transmits the response data packets from the software service to computer 102.

FIG. 8 illustrates an exemplary screenshot of a graphical user interface (GUI) 800 for a user to select optimization of data traffic to and from particular software services. The GUI 800 may be shown on a display of a user device (not shown) such as a personal computer (PC), a tablet computer, a mobile device, or any other suitable device. In an example, the GUI 800 is shown on the display of the user device via a browser or some other software application.

In various embodiments, the GUI 800 has a listing in column 810 of software services that are available for optimization. The service listing in column 810 may be updated on a periodic fixed schedule, upon the direction of a network administrator, or upon a triggering event. Column 820 of the GUI is an optional column that can show one or more IP addresses or subnet associated with each service. For each service available for optimization, the GUI 800 can optionally also provide the selected transit appliance from the overlay network to the service, in column 830. In column 840, a network administrator or end user can select which service it would like to determine the optimal transit appliance for. In exemplary embodiments, an end user may choose to enable optimization only for services that are actually used, or for services that are used frequently. Even though only checkboxes are shown in the optimization table, other selectable items can be provided, such as radio buttons or the like.

Figure 9:
FIG. 9 shows an exemplary global network of appliances in an overlay network.

FIG. 9 shows an exemplary global network of appliances in the overlay network. While there are only five appliances depicted in the figure, there can be any number of appliances connected to the overlay network, and they can be located in any geographic location around the world. A request for software service 110A may originate from computer 102 in any appliance location. Each appliance is in communication with portal 114, and maintains a copy of the service directory 200, a measured metric table 300, and an advertised metric table 400. Each appliance also is in communication with the other global appliances, and advertises its performance metric with the peer appliances. Furthermore, each appliance in the network may provide data optimization techniques. The transit appliance for software service 110A may be through any appliance in the global network. In exemplary embodiments, the transit appliance is the appliance geographically located closest to software service 110A, but does not have to be.

Thus, methods and systems for determining a transit appliance for data traffic to and from a software service are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for optimization of network traffic to a software service implemented as a software as a service (SaaS) within an overlay network, the method comprising:
   receiving network traffic destined for the software service as determined based on a network address contained in the network traffic;
   determining at least a first and second performance metrics associated with a corresponding network appliance of first and second network appliances and the software service, wherein each performance metric is measured with at least one network address usable to measure the performance metric;
   selecting the first network appliance over the second network appliance as a destination for the network traffic based on the first and second performance metrics, and
   receiving a service directory, the service directory comprising a list of available software services, a corresponding at least one network address for each software service of the available software services, and at least one test method for each combination of the software service and the corresponding at least one network address, wherein the first and second network appliances receive the service directory from a portal and maintain copies of the service directory and update the service directory based on a change to the service directory at the portal.

2. The method of claim 1, wherein the change includes at least one of an addition of a new software service, deletion of a software service, a change in a network address associated with a software service, or a change in a test method associated with a combination of a software service and a network address.

3. The method of claim 1, wherein the first network appliance uses the at least one test method to determine the first performance metric associated with the first network appliance for the software service.

4. The method of claim 3, wherein the first network appliance determines a derived performance metric that is calculated or selected based on the first performance metric.

5. The method of claim 4, wherein the determining the at least the first and second performance metrics associated with a corresponding network appliance of the first and second network appliances comprises:
   receiving the derived performance metric from the first network appliance.

6. The method of claim 4, further comprising:
   maintaining an advertised metric table comprising the first and second network appliances and advertised metrics received from corresponding network appliances of the first and second network appliances; and
   querying the advertised metric table to determine the first and second performance metrics.

7. The method of claim 6, wherein the advertised metric table organizes the first and second network appliances according to one or more associated subnets.

8. A system for optimization of network traffic to a software service implemented as a software as a service (SaaS) within an overlay network, the system comprising:
at least one processor; and
a memory storing instructions that, when executed by the at least one processor, cause the system to perform a method comprising:
receiving network traffic destined for the software service as determined based on a network address contained in the network traffic;
determining at least a first and second performance metrics associated with a corresponding network appliance of first and second network appliances and the software service, wherein each performance metric is measured with at least one network address usable to measure the performance metric;
selecting the first network appliance over the second network appliance as a destination for the network traffic based on the first and second performance metrics, and
receiving a service directory, the service directory comprising a list of available software services, a corresponding at least one network address for each software service of the available software services, and at least one test method for each combination of the software service and the corresponding at least one network address, wherein the first and second network appliances receive the service directory from a portal and maintain copies of the service directory and update the service directory based on a change to the service directory at the portal.

9. The system of claim 8, wherein the change includes at least one of an addition of a new software service, deletion of a software service, a change in a network address associated with a software service, or a change in a test method associated with a combination of a software service and a network address.

10. The system of claim 8, wherein the first network appliance uses the at least one test method to determine the first performance metric associated with the first network appliance for the software service.

11. The system of claim 10, wherein the first network appliance determines a derived performance metric that is calculated or selected based on the first performance metric.

12. The system of claim 11, wherein the memory storing instructions that, when executed by the at the least one processor, cause the system to perform the method comprising determining the at least the first and second performance metrics associated with a corresponding network appliance of the first and second network appliances, further cause the system to perform the method comprising:
receiving the derived performance metric from the first network appliance.

13. The system of claim 11, the memory storing instructions that, when executed by the at least one processor, cause the system to perform the method comprising:
maintaining an advertised metric table comprising the first and second network appliances and advertised metrics received from corresponding network appliances of the first and second network appliances; and
querying the advertised metric table to determine the first and second performance metrics.

14. The system of claim 13 wherein the advertised metric table organizes the first and second network appliances according to one or more associated subnets.

15. A non-transitory computer-readable storage medium including instructions that, when executed by at least one processor of a computing system, cause the computing system to perform a method for optimization of network traffic to a software service implemented as a software as a service (SaaS) within an overlay network, the method comprising:
receiving network traffic destined for the software service as determined based on a network address contained in the network traffic;
determining at least a first and second performance metrics associated with a corresponding network appliance of first and second network appliances and the software service, wherein each performance metric is measured with at least one network address usable to measure the performance metric;
selecting the first network appliance over the second network appliance as a destination for the network traffic based on the first and second performance metrics, and
receiving a service directory, the service directory comprising a list of available software services, a corresponding at least one network address for each software service of the available software services, and at least one test method for each combination of the software service and the corresponding at least one network address, wherein the first and second network appliances receive the service directory from a portal and maintain copies of the service directory and update the service directory based on a change to the service directory at the portal.

16. The non-transitory computer-readable storage medium of claim 6, wherein the change includes at least one of an addition of a new software service, deletion of a software service, a change in a network address associated with a software service, or a change in a test method associated with a combination of a software service and a network address.

17. The non-transitory computer-readable storage medium of claim 15, wherein the first network appliance uses the at least one test method to determine the first performance metric associated with the first network appliance for the software service.

18. The non-transitory computer-readable storage medium of claim 17, wherein the first network appliance determines a derived performance metric that is calculated or selected based on the first performance metric.

19. The non-transitory computer-readable storage medium of claim 18 storing instructions that, when executed by the at least one processor of the computing system, cause the computing system to perform the method comprising, determining the at least the first and second performance metrics associated with a corresponding network appliance of the first and second network appliances, further cause the computing system to perform the method comprising:
receiving the derived performance metric from the first network appliance.

20. The non-transitory computer-readable storage medium of claim 18 storing instructions that, when executed by the at least one processor of the computer system, cause the computing system to perform the method comprising:
maintaining an advertised metric table comprising the first and second network appliances and advertised metrics received from corresponding network appliances of the first and second network appliances; and querying the advertised metric table to determine the first and second performance metrics.

\* \* \* \* \*